United States Patent [19]
Yu et al.

[11] 4,312,770
[45] Jan. 26, 1982

[54] THICK FILM RESISTOR PASTE AND RESISTORS THEREFROM

[75] Inventors: Ruey J. Yu, Flint; Morris Berg, Grand Blanc, both of Mich.

[73] Assignee: General Motors Corporation, Detroit, Mich.

[21] Appl. No.: 55,970

[22] Filed: Jul. 9, 1979

[51] Int. Cl.$^3$ .............................................. H01B 1/02
[52] U.S. Cl. .................................. 252/514; 252/518; 252/519; 106/1.14; 427/125; 427/126.2; 428/446; 428/702; 338/308
[58] Field of Search ...................... 428/901, 446, 702; 252/514, 518, 519; 106/1.12, 1.13, 1.14, 1.26, 1.27, 1.28, 1.29, 53, 54; 427/58, 125, 126.1, 126.2, 126.3, 126.5, 126.6; 338/308

[56] References Cited
U.S. PATENT DOCUMENTS

| | | | |
|---|---|---|---|
| 3,304,199 | 2/1967 | Faber et al. | 252/514 |
| 3,352,797 | 11/1967 | Kim | 252/514 |
| 3,553,109 | 1/1971 | Hoffman | 252/514 |
| 3,560,410 | 2/1971 | Schubert | 252/518 |
| 3,583,931 | 6/1971 | Bouchard | 252/520 |
| 3,928,243 | 12/1975 | Kudza et al. | 252/514 |

*Primary Examiner*—Deborah L. Kyle
*Assistant Examiner*—J. L. Barr
*Attorney, Agent, or Firm*—Sidney Carter

[57] ABSTRACT

This invention relates to resistor compositions comprising, in % by weight, about 5–24% $RuO_2$, about 10–20% Ag, about 3–8% $Sb_2O_3$, about 8–12% CdO, about 35 to 70% lead-borosilicate glass, up to about 4% $Ta_2O_5$ and up to about 2% thermistor powder such as at least one of the transition metals $Mn_2O_3$, NiO, CuO, $Cr_2O_3$ and ZnO. These resistor compositions are adapted to be dispersed in a liquid vehicle to form a resistor ink or paste that can be applied to a surface of a ceramic substrate and fired to form a resistor having stable electrical and mechanical properties.

6 Claims, No Drawings

THICK FILM RESISTOR PASTE AND RESISTORS THEREFROM

DESCRIPTION

Precious metal resistor compositions for use in production of fired electrical resistors have become widespread in their use. Such compositions are typically based on the use of noble metals such as silver, gold, palladium platinum, iridium, rhodium and ruthenium together with a glassy binder which is of the non-conducting type. Typical of such compositions are those shown in Faber, Sr., U.S. Pat. No. 3,304,199, Kim U.S. Pat. No. 3,352,797, Hoffman U.S. Pat. No. 3,553,109, Schubert U.S. Pat. No. 3,560,410 and Bouchard U.S. Pat. No. 3,583,931. Since the cost of these metals is extremely high as compared to the cost of silver, it is highly desirable to develop compositions in which silver is used with the quantity of the other noble metals held to a minimum. It is also desirable to be able to closely and simply control the resistance of the compositions formulated.

Applicants' assignee has developed such silver based resistor compositions using relatively small quantities of ruthenium, variations in resistance resulting from control of the amounts of ruthenia and tantala glass used, as disclosed in U.S. Pat. No. 3,928,243 issued Dec. 23, 1975 to T. M. Kudza et al. While the use of inexpensive tantala conducting glass has enabled the use of smaller amounts of expensive noble metals, pre-reacting lead-borosilicate glass and tantalum oxide to form conducting tantala glass requires additional energy and is time consuming. Also, the resulting ink shows electrical instability in the absence of higher firing temperatures than the 700°–900° C. peak temperatures usually contemplated, this being a further energy drain and expense. For similar reasons, it is also desirable to eliminate the need for pre-reacting the ruthenium dioxide and antimony trioxide to form the pryrochlore type structure disclosed in U.S. Pat. No. 3,553,109.

This invention relates to resistor compositions comprising, in % by weight, about 5–24% $RuO_2$, about 10–20% Ag, about 3–8% $Sb_2O_3$, about 8–12% CdO, about 35 to 70% lead-borosilicate glass, up to about 4% $Ta_2O_5$ and up to about 2% thermistor powder such as at least one of the transition metals NiO, CuO, $Cr_2O_3$, ZnO and $Mn_2O_3$. These resistor compositions are adapted to be dispersed in a liquid vehicle to form a resistor ink or paste that can be applied to a surface of a ceramic substrate and fired to form a resistor having stable electrical and mechanical properties. The preferred resistor compositions of this invention comprise a mixture of metal and metal oxide with glass and consisting essentially of about 14 to 24% $RuO_2$, about 18 to 20% Ag, about 4 to 8% $Sb_2O_3$, about 10 to 12% CdO, about 35 to 48% lead-borosilicate glass, up to about 4% $Ta_2O_5$ and up to about 2% thermistor powder. The resistance values and temperature coefficient of resistance (TCR) may be varied by primarily varying the amount of $RuO_2$, resistivity varying inversely to the amount of ruthenia, with corresponding adjustment in the amount of glass used (increased glass with reduced ruthenia as shown in TABLE I), resistivities of from 100 ohms/square/mil to over 1 megohm having been obtained.

It is therefore an object of our invention to provide resistor ink compositions wherein variations in resistance may be obtained by varying the amount of ruthenia used, the metal and metal oxide constituents other than glass being un-prereacted.

It is a further object of our invention to provide resistor compositions using a minimum of the relatively expensive materials such as the noble metals.

It is also an object of our invention to provide a resistor having stable electrical characteristics.

As a result of extensive testing and development we have developed resistor compositions which utilize unreacted noble metal and metal oxide constituents in addition to non-conducting lead-borosilicate glass in making the low cost resistor ink of our invention. These inks, when applied to a non-conducting ceramic substrate and fired at elevated temperatures have produced resistors which have met all specification requirements governing resistor performance, i.e., humidity, thermal shock, T.C.R., 1000 hour load, and salt spray. Also, these compositions have produced fired resistors which are smooth surfaced and moisture resistant.

We have found that by the use of cadmium oxide in the unreacted form, i.e., without precalcining with other oxides such as bismuth and ruthenium oxides to form the pyrochlore-related oxides such as called for by U.S. Pat. No. 3,553,109, all required characteristics can be achieved at substantial cost savings. Also, since cadmium oxide is a flux, the melting point of the ink system is lowered thus improving the reactions between constituents during the firing schedule to form the stable, highly conducting, antimony ruthenate, and cadmium tantalum oxide or cadmium lead oxide.

In formulating the resistor compositions of our invention we use the following constituents in forming the batch powder mixture in weight %

| | weight % | preferred (for about 100–1000 ohm/sq./mil) |
|---|---|---|
| ruthenium dioxide | 5–24 | 14–24 |
| silver | 10–20 | 18–20 |
| tantalum oxide | up to about 4 | up to about 4 |
| antimony oxide | 3–8 | 4–8 |
| cadmium oxide | 8–12 | 10–12 |
| glass* | 35–70 | 35–48 |
| thermistor powder (about 17% NiO, 3% ZnO, 80% $Mn_2O_3$) | up to about 2% | up to about 1% |

*lead-borosilicate glass by Hercules, Inc., $SiO_2$ - 28%, $Al_2O_3$ - 3%, PbP - 57% and $B_2O_3$ - 12%.

In these compositions the glass functions as the solid solvent or matrix in the fired resistor and is non-conductive and therefore without effect on the resistivity as distinguished from those compositions using a conducting glass such as the tantala glass of U.S. Pat. No. 3,928,243 formed by pre-reaction of the borosilicate glass with tantala. The transition metal oxides such as $Cr_2O_3$, CuO, NiO, ZnO, and $Mn_2O_3$, if used, serve to adjust the TCR of the resistor. The metal and remaining metal oxides serve as conductors and as fluxing agents, e.g., CdO.

By way of example, TABLE I lists the batch composition of various resistor samples prepared in the manner set forth below and their respective resistivity and resistance values after firing. As can be seen, the resistivity and resistance values vary inversely with the amount of ruthenium oxide used, the fired resistance values being primarily determined by such varying of amounts. As shown, resistivity varying from about 100 ohm/square/mil to about 1 megohm/square/mil can be achieved by varying $RuO_2$ from about 6 to about 24 weight %.

TABLE I

Batch Compositions (Weight Percent)

| Sample Number | Resistance* Ohm/sq/mil | Ohm | $RuO_2$ | Ag | $Sb_2O_3$ | CdO | Glass | $Ta_2O_5$ | Thermistor powder |
|---|---|---|---|---|---|---|---|---|---|
| 1011 | 100 | 26 | 24 | 20 | 8 | 12 | 35 | 0 | 1 |
| 1211 | 120 | 30 | 22 | 18 | 5 | 10 | 42 | 2 | 1 |
| 1611 | 160 | 39 | 20 | 20 | 7 | 12 | 41 | 0 | 0 |
| 2111 | 200 | 50 | 18 | 19 | 4 | 11 | 44 | 4 | 0 |
| 4611 | 460 | 115 | 18 | 20 | 4 | 12 | 44 | 0 | 2 |
| 2011 | 200 | 50 | 18 | 19 | 4 | 11 | 44 | 4 | 0 |
| 8411 | 840 | 210 | 14 | 20 | 4 | 12 | 44 | 4 | 2 |
| 5611 | 560 | 140 | 16 | 20 | 6 | 11 | 47 | 0 | 0 |
| 8011 | 800 | 195 | 14 | 19 | 4 | 11 | 48 | 4 | 0 |
| 2013 | 20K | 5K | 12 | 18 | 5 | 10 | 55 | 0 | 0 |
| 1014 | 100K | 26K | 8 | 19 | 4 | 11 | 54 | 4 | 0 |
| 3214 | 320K | 78K | 8 | 16 | 4 | 8 | 64 | 0 | 0 |
| 2016 | 20M | 5M | 5 | 10 | 3 | 10 | 70 | 2 | 0 |
| 2611 | 260 | 65 | 18 | 19 | 4 | 11 | 44 | 3 | 1 |
|  |  |  | (Blend 27% | 4611 | with | 73% | 2111) |  |  |
| 2811 | 280 | 70 | 17 | 19 | 4 | 11.3 | 44 | 4 | 0.7 |
|  |  |  | (Blend 33% | 8411 | with | 67% | 2011) |  |  |
| GG2103 | 260 | 65 | 19 | 18 | 5 | 10 | 44 | 3 | 1 |
|  |  |  | (Blend 34% | 8011 | with | 66% | 1211) |  |  |

*Fired at 800° C. with 2 inch per minute belt speed.

As stated, the glass used in our invention is preferably a lead-borosilicate glass as, for example, a glass with constituents in the following ranges by weight percent:

| $SiO_2$ | 24–32, | 28 preferred |
|---|---|---|
| $Al_2O_3$ | 0–5, | 3 preferred |
| PbO | 48–66, | 57 preferred |
| $B_2O_3$ | 10–14 | 12 preferred |

The preferred mixture is an example of a commercial glass binder which is suitable for the compositions of our inventions and is sold by Drakenfeld Division of Hercules, Inc. under the label E-1313. Any conventional lead-borosilicate glass commercially available should serve.

We have found that the final resistance value of a particular batch is also slightly affected by the soak temperature and soak time during resistor body firing. This control is desirable from the production viewpoint in that final resistance value can be adjusted by modifying firing schedule.

Extensive testing has been conducted to show the fired resistance values of each ink composition as affected by various firing schedules with soak temperatures at 740° C., 780° C., 800° C., 820° C., and 840° C., each with three different furnace belt speeds. Variation in resistance with different soak temperatures at 2 inches/minute belt speed for several ink compositions are shown in TABLE II. It is found that the sensitivity of resistance variation to the variation in soak temperature are less than 1.5% per degree C. from 740° C. to 840° C. For those ink compositions of less than 1000 ohm per square, the sensitivity of the fired resistance due to variation in furnace belt speed (±3 minutes) is less than ±5%.

TABLE II

| Sample Number | 1211 | 8011 | 1014 |
|---|---|---|---|
| Resistivity (Ohm/Square/Mil) | 120 | 800 | 100,000 |
| T.C.R. ppm/deg. C. (25 to 125° C.) | 162 | 78 | −460 |
| Sensitivity at Peak | | | |

TABLE II-continued

| Temperature 800° C. (±3 minutes exposure time) | less than ±5% | less than ±5% | less than ±20% |
|---|---|---|---|
| Sensitivity to Peak Firing Temperatures | very little (740 ~ 780° C.) less than 0.5%/°C. (780 ~ 840° C.) | less than 1%/°C. very little (780 ~ 840° C.) | less than 1%/°C. less than 1.5%/°C. |

Also shown in TABLE II are the hot TCR values for three samples shown in TABLE I, as measured over the range of 25° to 125° C. in accordance with the following formula:

Hot and cold TCR (Temperature Coefficient of Resistance) are defined as follows:

$$\text{Hot } TCR = \frac{9}{5} \cdot \frac{1}{Th - Ta} \cdot \frac{Rh - Ra}{Ra} \times 10^6$$

$$\text{Cold } TCR = \frac{9}{5} \cdot \frac{1}{Ta - Tl} \cdot \frac{Ra - Rl}{Ra} \times 10^6$$

where
Th=High temperature limit in degrees F.
Ta=Room temperature (80° F.)
Tl=Low temperature limit in degrees F.
Rh=Resistance measured in ohms at Th
Ra=Resistance measured in ohms at Ta and
Rl=Resistance measured in ohms at Tl.

The Hot TCR in ppm/°C. (parts per million per degree C.) from 80° F. to 270° F. and the cold TCR from 80° F. to −40° F. for several typical resistor ink compositions have been measured. Also, the variation of Hot TCR with respect to the various soak temperatures and time during resistor firing has been determined. It is shown by the test data that to minimize Hot TCR variation due to the firing of the resistor ink, the furnace soak temperature for those ink compositions below 1000 ohms/square/mil should be limited to below 820° C. It was also found that TCR (hot or cold) for such compositions is within ±200 ppm/°C., a limit generally accepted for a good resistor.

The test data also covered the determination of the TCR for several batches of particular resistor compositions when prepared and tested under laboratory conditions and under regular production conditions as well as for a standard commercial resistor ink of comparable resistivity when processed under standard production conditions. The results shown in TABLE III demonstrate the resistors formed using inks formulated in accordance with our invention to be more stable (less spread) than those using a standard commercial ink.

TABLE III

| Resistor Sample # | TCR (mean for all samples) | | | |
|---|---|---|---|---|
| | −40° C. to 25° C. | 25° C. to 124° C. | 25° C. to 204° C. | Total Spread |
| 2611 (Lab.) | 118.4 | 158.1 | 176.4 | 58 |
| 2811 (Lab.) | 23.7 | 72.7 | 100 | 76.3 |
| 2811 (Prodn.) | 25.3 | 70.3 | 97.6 | 72.3 |
| Commercial Ink (Prodn.) | −33.0 | 98.7 | 160.1 | 193.1 |

In making-up a resistor from the inks formulated in accordance with our invention, it is preferred to blend together an ink of low resistivity with one of high resistivity to yield an ink having the desired resistance range on firing. This is done to compensate for the possible variance in resistance of as much as about ±20% between particular batches. For example, Sample #2811 in TABLE I is formulated using 33% of #8411 (840 ohm/sq./mil) with 67% #2011 (200 ohm/sq./mil) to yield a batch having a resistivity of 280 ohm/sq./mil. Our tests have shown that the blending of ink batches presents no difficulty.

The blended ink is then screen printed on the ceramic substrate into the required geometry as required by its specific applications. Parts are then dried at about 300° F. for 5–10 minutes. A conducting coating for termination and connection is then printed and dried in a similar manner using, for example, du Pont 7095 silver ink. Parts are then cured in a belt furnace with soak temperatures between 700° C. to 900° C. and soak time between 5 to 20 minutes. A typical firing schedule takes about one hour using a furnace belt speed of 2 inches/minute and an air flow rate of 40 cubic feet/hour would be to go from 25° to about 525° C. over a period of about 16 minutes, from about 525° to about 800° C. over a period of about 10 minutes, soak at about 800° C. for a period of about 6 minutes, from about 800° to about 575° C. over a period of about 16 minutes, and from about 575° to room temperature over a period of about 20 minutes. The fired resistors are then laser trimmed to bring the final resistance to within ±1%.

The ink of the above example is made by the following procedure which is here described merely by way of example, other suitable techniques being well known in the art:

1. Weigh out the constituents of Sample #8011 and
2. place the resistor constituents in a 1-quart ball mill. Cover the grinding balls with alcohol and mill for 10 hours.
3. Wash the contents of the mill into an evaporating dish through a 400 mesh screen using alcohol.
4. Evaporate the alcohol and weigh the dried contents.
5. Blend 25 weight percent of an organic silk screen medium such as Reusch Squeegee medium No. 163-C containing ethyl cellulose and dibutyl-carbitol, any inert liquid which is removable at firing temperatures may be used, with dried contents for approximately 5 minutes to make a thick paste which is then
6. milled until uniformly blended into an ink.
7. Adjust the ink viscosity to 200,000 centipoise as measured with a Brookfield viscometer by adding dibutyl carbitol.
8. Weigh out the constituents of Sample #1211 and repeat steps 2 thru 7.
9. Blend approximately 66 weight percent of the #1211 ink with 34 weight percent of the #8011 ink.

We have also found that the refiring ability of the inks of our invention are excellent. Changes in resistance after second refirings for the Sample #2111 ink is less than 10% as compared to 80% for the commercial ink, above referenced.

X-ray diffraction examination of resistors made using Samples #8011 and #1014 show, for each, silver metal as the major phase with pyrochlore type material and $Ta_2Cd_2O_7$ as the minor phases. Only a trace of $RuO_2$ was indicated. Examination of the fired resistor surface for Sample #2111 and of an ink now in use, at 2400 × magnification, shows the resistor of our invention to have substantially the same desirable structure, a minimum of voids.

From the above description and data it can be seen that the resistor batch compositions and their resistors have electrical and physical properties which are as good as or better than the commercially available resistor ink currently in production use by applicants' assignee. It is intended that alternatives and equivalents which may be apparent to those skilled in the art be within the scope of our invention as determined by the scope of the claims which follow.

The embodiments of the invention in which an exclusive property or privilege is claimed are defined as follows:

1. A resistor composition comprising, in weight %, about 35 to 70% lead-borosilicate glass and the following un-prereacted noble metal and metal oxides: silver in the amount of about 10–20%, about 5–24% $RuO_2$, about 3–8% $Sb_2O_3$, about 8–12% CdO, up to about 4% $Ta_2O_5$ and up to about 2% of at least one thermistor powder selected from the group consisting of $Cr_2O_3$, CuO, NiO, ZnO and $Mn_2O_3$, said resistor composition being adapted to form fired resistors having stable electrical and physical properties.

2. A resistor composition in weight % adapted to be applied to a ceramic substrate for firing at elevated temperatures to form a resistor having stable electrical and physical properties, said composition comprising about 18 to 20% Ag, about 14 to 24% $RuO_2$, about 4 to 8% $Sb_2O_3$, about 10 to 12% CdO, about 35 to 48% lead-borosilicate glass, up to about 4% $Ta_2O_5$ and up to about 2% of at least one of the transition metal oxides selected from the group consisting of $Cr_2O_3$, NiO, CuO, ZnO, and $Mn_2O_3$, the metal oxides and silver being used without prereaction.

3. A resistor composition in weight % adapted to be applied to a ceramic substrate for firing at elevated temperatures to form a resistor having stable electrical and physical properties, said composition comprising about 17 to 19% $RuO_2$, about 18–19% Ag, about 4–5% $Sb_2O_3$, about 10 to 12% CdO, about 44% lead-borosilicate glass, about 3–4% $Ta_2O_5$ and about 0.7–1% of a mixture of about 80% $Mn_2O_3$, 17% NiO and 3% ZnO, the metal oxides and silver being used without pre-reaction.

4. A resistor element having stable electrical and physical properties comprising an electrically non-conducting substrate having a resistance coating fired thereon at a peak temperature of from 700°–900° C., said coating being formed from a batch composition comprising, in weight %, about 35 to 70% lead-borosilicate glass and the following un-prereacted noble metal oxides: silver in the amount of about 10–20%, about 5–24% $RuO_2$, about 3–8% $Sb_2O_3$, about 8–12% CdO, up to about 4% $Ta_2O_5$ and up to about 2% of at least one thermistor powder selected from the group consisting of NiO, $Cr_2O_3$, CuO, ZnO and $Mn_2O_3$.

5. A resistor element having stable electrical and physical properties comprising an electrically non-conducting substrate having a resistance coating fired thereon at a peak temperature of from 700°–900° C., said coating being formed from a batch composition comprising about 18 to 20% Ag, about 14 to 24% $RuO_2$, about 4 to 8% $Sb_2O_3$, about 10 to 12% CdO, about 35 to 48% lead-borosilicate glass, up to about 4% $Ta_2O_5$ and up to about 2% of at least one of the transition metal oxides selected from the group consisting of $Cr_2O_3$, CuO, ZnO, NiO, and $Mn_2O_3$.

6. A resistor element having stable electrical and physical properties comprising an electrically non-conducting substrate having a resistance coating fired thereon at a peak temperature of from 700°–900° C., said coating being formed from a batch composition comprising about 17 to 19% $RuO_2$, about 18–19% Ag, about 4–5% $Sb_2O_3$, about 10 to 12% CdO, about 44% lead-borosilicate glass, about 3–4% $Ta_2O_5$ and about 0.7–1% of a mixture of about 80% $Mn_2O_3$, 17% NiO and 3% ZnO.

* * * * *

UNITED STATES PATENT AND TRADEMARK OFFICE
CERTIFICATE OF CORRECTION

PATENT NO. : 4,312,770
DATED : January 26, 1982
INVENTOR(S) : Ruey J. Yu and Morris Berg It is certified that error appears in the above-identified patent and that said Letters Patent are hereby corrected as shown below:

Column 2, line 46, footnote below chart, "PbP" should read -- PbO --.

Column 6, line 20, "showns" should read -- shows --.

Column 7, line 4, claim 4, after "metal" insert -- and metal --.

Signed and Sealed this

Twentieth Day of April 1982

[SEAL]

Attest:

GERALD J. MOSSINGHOFF

Attesting Officer    Commissioner of Patents and Trademarks